(12) United States Patent
Villegas

(10) Patent No.: US 7,044,740 B2
(45) Date of Patent: May 16, 2006

(54) EDUCATIONAL GAME FOR REINFORCING RULES OF ETIQUETTE

(76) Inventor: Ann Villegas, 1 Grove St., Sea Cliff, NY (US) 11579

( * ) Notice: Subject to any disclaimer, the term of this patent is extended or adjusted under 35 U.S.C. 154(b) by 78 days.

(21) Appl. No.: 10/412,762

(22) Filed: Apr. 10, 2003

(65) Prior Publication Data
US 2004/0076943 A1    Apr. 22, 2004

Related U.S. Application Data

(60) Provisional application No. 60/371,316, filed on Apr. 10, 2002.

(51) Int. Cl.
G09B 19/22    (2006.01)

(52) U.S. Cl. .................. 434/129; 434/236; 434/238; 273/292; 273/459

(58) Field of Classification Search ............... 434/129, 434/236, 237, 238; 273/292, 459, 432
See application file for complete search history.

(56) References Cited

U.S. PATENT DOCUMENTS

| | | |
|---|---|---|
| 4,512,746 A | 4/1985 | Turner |
| 4,801,149 A | 1/1989 | Alnafissa |
| 5,375,846 A | 12/1994 | Smith |
| 5,439,232 A | 8/1995 | Pollock |
| 5,551,700 A | 9/1996 | Druce et al. |
| 5,836,587 A | 11/1998 | Druce et al. |
| 5,967,517 A | 10/1999 | Villano |
| 6,464,222 B1 * | 10/2002 | Parker .................. 273/236 |

OTHER PUBLICATIONS

"Ideas at Play Children's Good Manners Month", Jan. 5, 2002.*

"A Mouthfu of Peas Teaching the Bad Manners Game", Lisa Cohn, 2004.*

* cited by examiner

Primary Examiner—Dmitry Suhol
(74) Attorney, Agent, or Firm—Kenyon & Kenyon LLP

(57) ABSTRACT

An educational game to reinforce the rules of etiquette is described. A marker is passed between players when a player catches another player in a violation of the announced rules of etiquette. The player having the marker at the end of the game is subject to a sanction. Alternatively, the player having the marker at the end of the game is entitled to a reward.

15 Claims, 3 Drawing Sheets

MANNER RULE 1:

NO TALKING WITH
FOOD IN MOUTH

FIG. 2

EDUCATIONAL GAME FOR REINFORCING RULES OF ETIQUETTE

The present non-provisional application claims priority from provisional application 60/371,316 filed Apr. 10, 2002.

FIELD OF THE INVENTION

The present invention relates to an educational game. More particularly, the present invention provides a game that reinforces certain rules of etiquette.

BACKGROUND INFORMATION

Games can be effective devices for learning and remembering rules. Indeed, playing games can be a useful method of indirectly teaching general socialization skills. The use of a game to directly reinforce the learning of social etiquette as a primary purpose is not known, however.

In one example card game commonly referred to as "Old Maid" the rules of the game dictate that the person holding the old maid card at the end of the game is the loser. In a game called "Hot Potato" the rules dictate that the person holding the potato at the end of the game is the loser. Furthermore, a game called "Tag" designates one person as the person who is "it". The person who is "it" tries to touch another person. Successfully touching another person causes the person who is touched to become "it". The game of tag does not necessarily have an ending, but the players may agree to end or suspend the game. None of these typical games directly reinforces rules of etiquette in a social setting, and it is not typical for any of these games to be played during a meal, for example.

SUMMARY OF THE INVENTION

The present invention is directed to a game for reinforcing the learning and application of the rules of social etiquette. Herein the inventor refers to the specific rules of etiquette to be reinforced as "manner rules." In one exemplary embodiment of the invention, a group of people plays the game during a meal. A tangible marker is placed on the table at one of the occupied seats. The person occupying the seat having the marker is referred to as the "enforcer." In this embodiment, the enforcer attempts to catch another player violating any of the manner rules. When another player is caught violating the rules, the enforcer passes the marker to the player who was caught and play continues with the player who was caught as the enforcer. The new enforcer attempts to catch any other player violating any of the manner rules, so that the marker is not retained by the enforcer. The player who is an enforcer at the end of the game is subject to a sanction. In an alternative embodiment, all of the other players, except for the final enforcer, share in a reward. In yet another exemplary embodiment, only those players who were never the enforcer during the game are entitled to a reward. Any combination of rewards and sanctions may be included within the scope of the invention, such that a reward may be granted to certain players for favorable scores, such as no violations, and sanctions may be awarded to other players with unfavorable scores, such as three violations. In yet another exemplary embodiment, the rewards and sanctions may be cumulative over a longer period than one game. In a typical exemplary embodiment, the game begins at the start of a meal and ends at the end of the meal; however, in one alternative exemplary embodiment, a timer is used and sanctions and rewards are determined at the end of each game period during the meal.

One goal of the present invention is to reinforce the learning of certain rules of etiquette. Another goal is to provide a fun and entertaining social environment for a family.

BRIEF DESCRIPTION OF THE FIGURES

For the purpose of illustrating the invention, representative embodiments are shown in the accompanying figures, it being understood that the invention is not intended to be limited to the precise arrangements and instrumentalities shown.

FIG. 2 shows a single card from a deck of cards, wherein each card contains at least one manner rule.

DETAILED DESCRIPTION

The present invention will now be described in detail for specific embodiments of the invention. These embodiments are intended only as illustrative examples and the invention is not to be limited thereto.

In one exemplary embodiment, the game is played during a meal and reinforces table etiquette. In this exemplary embodiment, the players are the people who are sharing a meal together, and a marker is placed at the seat of one of the players. A list of rules is announced. In one embodiment this list of rules is referred to as "manner rules." For a game occurring at a meal, these rules can include, but are not limited to, no elbows on the table, no chewing with an open mouth, no talking with any food remaining in the mouth, no reaching across the table, no reaching across another player's plate, no slouching, no eating with fingers, and no standing without first asking to be excused. The play begins with the serving of the meal. The player having the marker is referred to as the "enforcer." When the enforcer sees another player violating one of the manner rules, the enforcer challenges the other player, who is referred to as the "violator," announcing the player's name and the rule violated. Then, the marker is passed from the enforcer to the violator, and the violator becomes the new enforcer. Play continues in this manner until the end of the game. In a typical embodiment the end of the game coincides with the end of the meal. Alternatively, the duration of the game may be controlled by a timer, such as a clock, alarm clock, count down timer, egg timer, or hourglass type timer. The player having the marker at the end of the game loses, and a sanction is imposed on the loser of the game. Although not limited to the enumerated sanctions, some possible examples of sanctions include clearing the table, setting the table the following meal, washing the dishes, drying the dishes, feeding the family pet, walking the family pet, and helping to prepare the next meal.

Figure 1:
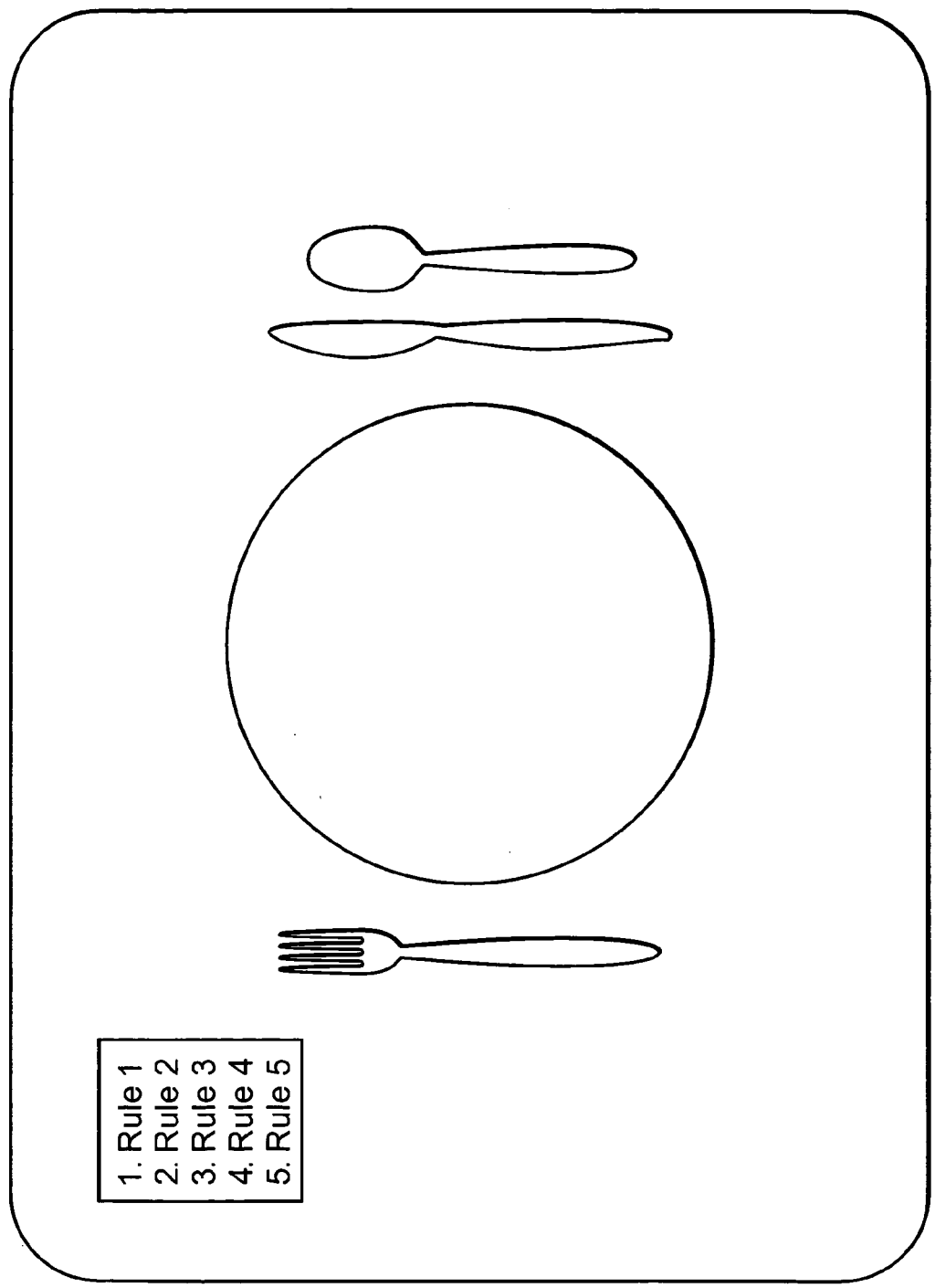
FIG. 1 is a placemat for meals that has a transparent pocket for insertion of rules.
Figure 2:
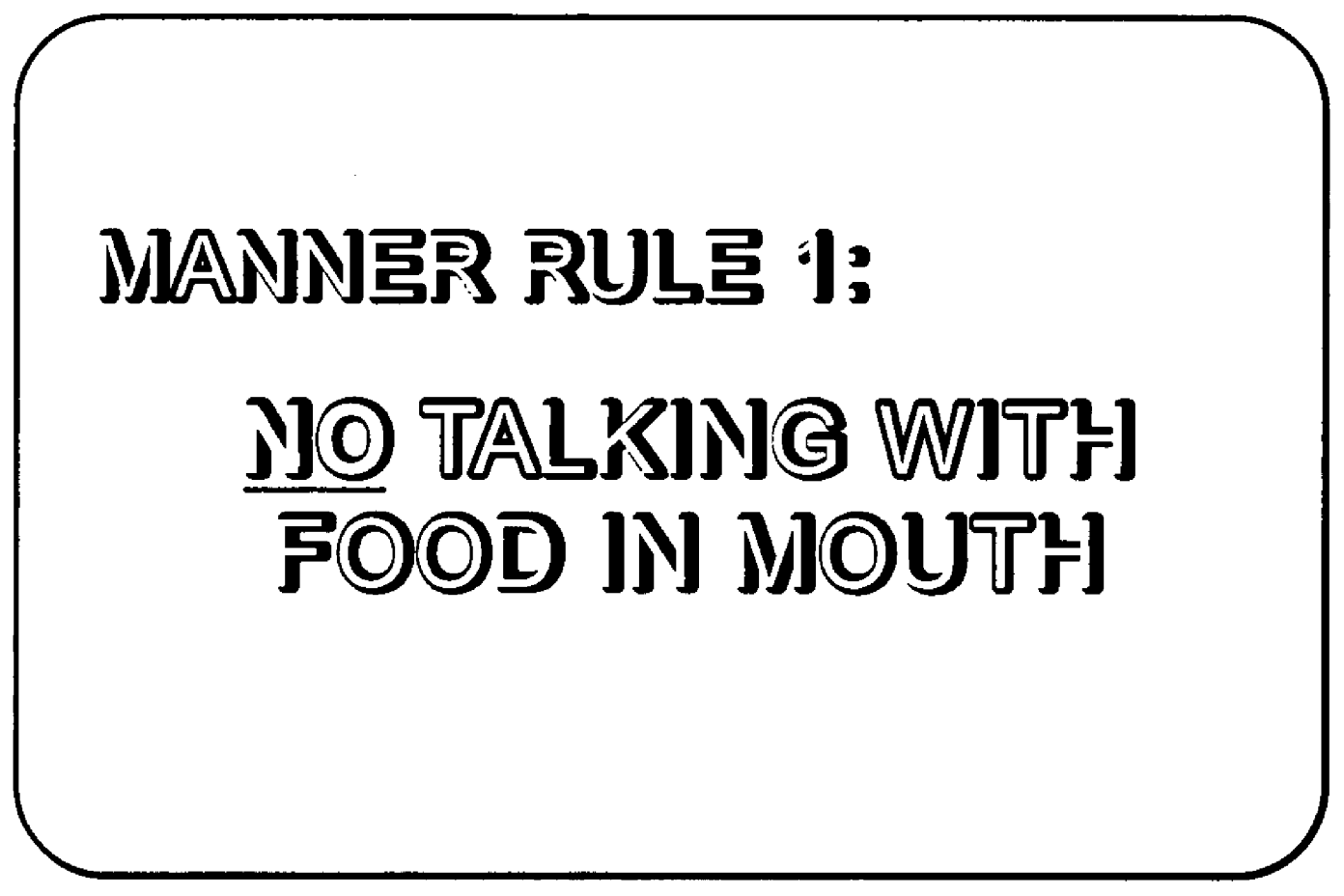
Figure 3:
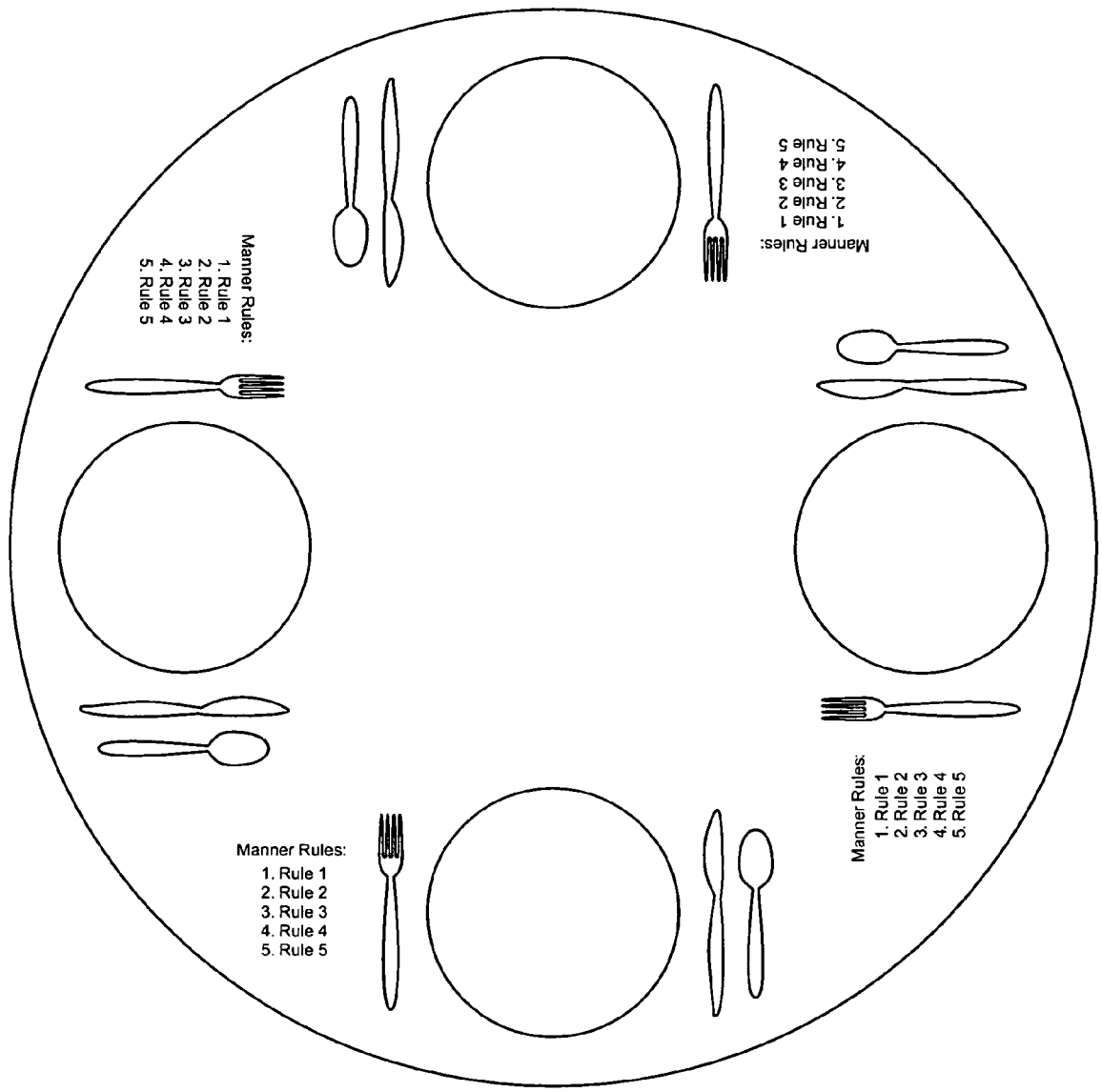
FIG. 3 is a tablecloth having place settings depicted on the tablecloth and having a plurality of manner rules written at each place setting.

In alternative embodiments other manner rules can be announced, and manner rules can change from one game to the next. As an initial set of manner rules is mastered, rules may be added or changed, progressing to ever more difficult, challenging and stimulating play. In one embodiment, the rules are printed or typed on a card for each player, and each player inserts the card into a transparent window in a game placemat. In one alternative exemplary embodiment, the manner rules may be selected from a deck of manner rule cards by shuffling the deck and selecting a plurality of cards from the deck. An example of a manner rule card is shown in FIG. 2. In one typical exemplary embodiment, ten cards are dealt from a shuffled deck of manner cards. The rule on each of the cards is announced at the beginning of the game. The announcement may be made by any person, such as the initial enforcer or any other player. In one embodiment, the ten cards that are dealt are placed in a holder on the table that is visible only to the enforcer. In one possible embodiment, the holder stands upright in front of the enforcer and has flaps that hide the cards from the view of players seated to the right and left of the enforcer. In this embodiment, the other players are required to remember the rules in order to avoid committing a violation. In yet another exemplary embodiment, the rules can be printed on a tablecloth. In yet another alternative embodiment, the rule cards may be placed in a transparent pocket or transparent pockets that are provided on the tablecloth or on a place mat. For example, the material used for the transparent pocket can be a transparent polymer, such as transparent acetate, mylar, polyurethane, polycarbonate, acrylic, and polystyrene. The transparent material can be either rigid or flexible and is not limited to any particular transparent material. One possible example of a tablecloth is shown in FIG. 3.

In yet another alternative exemplary embodiment, the sanction selected for the losing player may be determined using a deck of sanction cards. In this exemplary embodiment, the deck of sanction cards is shuffled, and the losing player selects one card from the deck. In one embodiment, the losing player cuts the deck, and the card revealed on the bottom of the top half of the deck is the sanction. In another embodiment, the losing player selects one card off of the top of the sanction deck. It is understood that other variations for selecting a sanction card from a deck of cards may be used. In another alternative embodiment, the sanction can be selected by a majority vote by the players prior to the game. Alternatively, a neutral arbitrator who is not participating in the game can determine the sanction.

In yet another embodiment of the invention, any and all players who never violated the manner rules and never received the marker are declared winners and are entitled to a reward. In one specific alternative exemplary embodiment, all of the players, except for the last enforcer, are entitled to a reward. In yet another specific embodiment, winners are entitled to a reward, and losers are subject to a sanction. In this exemplary embodiment, the winners and losers may be determined by a predetermined number of violations that each player committed during a meal. As an example, which is not intended to limit the scope of the invention, the players or the arbitrator could select three total violations as the cutoff for winning. Then, a player that receives three or more violations would be subject to a sanction, whereas a player with less than three sanctions would be entitled to a reward. In one specific alternative, the player having the marker at the end of the game loses, regardless of the number of violations received, and the player that had the marker previous to this player is a winner; regardless of the number of violations received. In one specific exemplary embodiment, miniature markers having the same likeness as the marker used to designate an enforcer are included in the game. In this specific embodiment, the miniature markers are used to keep track of the number of violations of each player. One miniature marker is awarded to a player each time that the player is challenged and is found to have committed a violation of the manner rules. In a specific embodiment, the game includes 24 markers comprising eight different colors with three miniatures markers in each of the 8 different colors. In this specific embodiment, the cutoff is three violations, and a player with three or more violations during a game will have three miniature markers of the same color and will be subject to a sanction. Any player with less than three miniature markers is entitled to a reward.

In one embodiment, the initial position of the marker can be arbitrary. Alternatively, the marker can be placed initially at the youngest player's seat. In yet another embodiment, the marker can be placed according to the spin of a wheel, a disk or an arrow that indicates or points to the seat where the marker will be placed initially. One of ordinary skill in the art will recognize that there are many variations for choosing the initial location of the marker, and all of these variations are considered to be within the scope of the invention.

The marker can be any object that is visible and moveable from one player to another. In one specific embodiment the marker resembles a pig. As an alternative, in this embodiment the enforcer can be required to first declare "pig out" before the violator may challenge a violator. Upon announcing the words "pig out," all of the other players are required to freeze momentarily until the violator and violation are identified. This rule is not essential to the game, but it can help to resolve disputes between an enforcer and a violator. As one specific embodiment, if miniature markers are included with this game to keep track of recurring violations, the miniature markers would resemble a pig, but would be smaller than the marker used to designate the enforcer. The miniature markers can have the same color or can have different colors. If the miniature markers have different colors, then the different colors can identify specific players. In another exemplary embodiment only the enforcer, the player currently having the marker, may challenge another player about any violation of the manner rules. When a violator is caught breaking one of the manner rules, then the enforcer passes the marker to the violator. Thereafter, the violator becomes the enforcer. In one embodiment of the invention, the new enforcer cannot challenge the previous enforcer. In an alternative embodiment, the enforcer may challenge any violator, including the previous enforcer. In yet another embodiment, any player may challenge any other player with a violation, and the marker is passed from any previous violator to the new violator. Alternatively, no marker is needed in this embodiment of the invention. Instead, a miniature marker could be awarded to a player for each violation, and any player may challenge any other player. In yet another embodiment, a marker is used and the marker moves either to the player challenged, if challenged successfully, or to the player who falsely challenged the other player. In one embodiment a vote of the players is taken to determine the outcome of disputed challenges, and a majority of voting players decides the outcome. In an alternative embodiment, a nonparticipant is designated as the "arbitrator." The role of the arbitrator is to settle disputes arising between the enforcer and the violator.

In yet another embodiment, the marker may be set in the middle of the table initially. In this embodiment, the first player to catch another player captures the marker and moves the marker to his or her own seat. Thereafter, all of the other players are now enforcers and can catch any other player in a violation of the manner rules. When a violator is caught by another player, the other player who catches the violator captures the marker. In one specific embodiment of this invention, miniature markers are used, and the object of the game is to collect enough miniature markers to be entitled to a reward or to avoid a sanction. In an alternative embodiment, the other players can only challenge the current holder of the marker in a violation of the rules, and thereby capture the marker. In another embodiment, the player having the marker at the end of the game is the winner, and the winner is entitled to a reward, such as an extra piece of desert or the choice of television programs to watch after the meal.

Many rewards are possible, and these rewards, which are known to those of ordinary skill in the art, are within the scope of the present invention. Indeed, a deck of reward cards may be included in the game, such that rewards are determined by having winners select a reward card from the shuffled reward deck.

What is claimed is:

1. A method of teaching etiquette skills, comprising:
    placing a marker in front of a person in a group of at least two people;
    obtaining a deck of manner rule cards a deck of sanction cards;
    dealing a manner rule card to each person in the group;
    reading a set of rules of social etiquette to the group on the manner rule cards dealt inserting the manner rule cards in a holder for viewing by the group;
    observing etiquette skills of the group by the person with the marker;
    announcing a breach of etiquette by the person with the marker, based upon the set of rules of social etiquette, when a rule in the set of rules of social etiquette is broken by a violating person in the group;
    providing a sanction card to the violating person in the group; and
    performing a sanction on the sanction card by the violating person.

2. The method according to claim 1, further comprising:
    transferring the marker to the violating person in the group.

3. The method according to claim 1, wherein the observing etiquette skills occurs during a meal.

4. The method according to claim 3, further comprising:
    rewarding persons of the group who do not breach a rule of social etiquette at an end of the meal.

5. The method according to claim 1, further comprising:
    setting a timer before placing the marker; and
    ending the method when the timer expires.

6. The method according to claim 1, wherein the sanction includes clearing a table of dishes.

7. The method according to claim 1, wherein the sanction includes setting a table at a following meal.

8. The method according to claim 1, further comprising:
    selecting an alternate set of rules of social etiquette;
    observing the etiquette skills of the group by the person with the marker; and
    announcing a breach of etiquette by the person with the marker, based upon the alternate set of rules of social etiquette, when a rule in the alternate set of rules of social etiquette is broken.

9. The method according to claim 1, further comprising:
    announcing the set of rules to the group after the step of reading the set of rules of social etiquette.

10. The method according to claim 1, wherein the violating person in the group is given a point for each breach of the rules of social etiquette.

11. The method according to claim 10, wherein the observing and announcing continues until a person in the group accumulates three points, wherein the person accumulating three points is removed from the group.

12. The method according to claim 11, further comprising:
    selecting a card from a sanction deck by the person accumulating three points.

13. The method according to claim 10, wherein a miniature marker is placed before the violating person to indicate a number of violations.

14. The method according to claim 1, further comprising:
    spinning a wheel to determine the placing of the marker.

15. The method according to claim 1, further comprising:
    requiring the group to stop motion by a command from the person with the marker after the step of observing the etiquette skills, upon a breach of the social rules of etiquette.

* * * * *